United States Patent [19]
Murata et al.

[11] Patent Number: 5,392,111
[45] Date of Patent: Feb. 21, 1995

[54] METHOD OF MEASURING AND ADJUSTING OPTICAL AXIS OF HEADLIGHT

[75] Inventors: Nagatoshi Murata; Shinichi Watanabe; Manabu Tuchida, all of Sayama, Japan

[73] Assignee: Honda Giken Kogyo Kabushiki Kaisha, Tokyo, Japan

[21] Appl. No.: 31,468

[22] Filed: Mar. 15, 1993

Related U.S. Application Data

[63] Continuation-in-part of Ser. No. 773,008, Oct. 8, 1991, abandoned.

[30] Foreign Application Priority Data

| Oct. 9, 1990 | [JP] | Japan | 2-269354 |
| Dec. 28, 1992 | [JP] | Japan | 4-347791 |
| Jan. 8, 1993 | [JP] | Japan | 5-2031 |
| Jan. 8, 1993 | [JP] | Japan | 5-2061 |

[51] Int. Cl.$^6$ ............................. G01J 1/00
[52] U.S. Cl. .................. 356/121; 356/154; 33/288; 33/335
[58] Field of Search ............ 356/121, 122, 123, 138, 356/141, 147, 150–154, 213, 218, 221; 33/288, 335; 348/94, 95

[56] References Cited

U.S. PATENT DOCUMENTS

| 1,266,525 | 5/1918 | Otte | 356/121 |
| 2,001,660 | 5/1935 | Abendroth | 356/122 |
| 3,435,246 | 3/1969 | Webb | 356/121 |
| 3,830,570 | 8/1974 | Groetzner et al. | 356/121 |
| 4,498,767 | 2/1985 | McGovern et al. | 356/121 |
| 4,679,935 | 7/1987 | Fukuda et al. | 356/121 |
| 4,730,923 | 3/1988 | Kosugi et al. | 356/121 |
| 4,907,877 | 3/1990 | Fukuda et al. | 356/121 |

FOREIGN PATENT DOCUMENTS

996897 2/1983 U.S.S.R. .

*Primary Examiner*—Hoa Q. Pham
*Attorney, Agent, or Firm*—Nikaido, Marmelstein, Murray & Oram

[57] ABSTRACT

An optical axis of a headlight is measured by disposing a lattice member in front of the headlight. The lattice member has a plurality of longitudinally elongated lattice holes which are arranged in a form of a matrix. An illuminated area and an illuminance of light beams to be transmitted through the lattice member are measured at each of illuminating regions which are divided into a form of a matrix by the lattice holes. The position of a light source of the headlight is located from an illuminating region of maximum illuminated area and a position of an optical axis of the headlight is located from an illuminating region of maximum illuminance. The optical axis is adjusted depending on the located position of the light source and the position of the optical axis such that the inclination angle of the optical axis coincides with a set inclination angle. An illuminance distribution pattern is used to judge the type of headlight during adjustment of the optical axis of the headlight.

8 Claims, 10 Drawing Sheets

METHOD OF MEASURING AND ADJUSTING OPTICAL AXIS OF HEADLIGHT

This application is a continuation-in-part application of U.S. Ser. No. 773,008, filed Oct. 8, 1991, now abandoned.

FIELD OF THE INVENTION

This invention relates to a method of measuring an optical axis of a headlight of an automobile or other vehicles and a method of adjusting the optical axis by utilizing this method of measuring.

BACKGROUND OF THE INVENTION

In order to secure a front visibility as well as to prevent blinding of a driver on an automobile running in the opposite direction, there are regulations on vertical and horizontal illuminating directions of a headlight.

According to the Japanese domestic regulations, there are specified the position of an optical axis (set inclination $\Theta_s$) and the illuminance of a high beam on a screen 10 meters ahead. However, in order to reduce the space required for measuring them, it is also approved to measure the position of the optical axis and the illuminance on a screen 3 meters ahead for thereafter converting them to values corresponding to those on the screen 10 meters ahead.

Conventionally, there is disclosed a method in Japanese Published Examined Patent Application No. 63849/1988, in which an illuminating pattern of headlight beams illuminated on a screen is pictured, isolux region having illuminance above a predetermined level is located by picture processing, and a geometric center of gravity of the located isolux region is calculated, thereby measuring the position of the optical axis on the screen.

The headlight is so designed that, at a short distance, there is formed an illuminating pattern which is laterally spread and is not symmetrical relative to the optical axis to improve the visibility of a road surface and a road edge and that, at a long distance, the light beams are narrowed. Therefore, light beams not appearing at a long distance are also illuminated on the screen at a short distance, and there is given rise to a difference between that position of the optical axis on the screen 10 meters ahead which is calculated on the basis of the illuminating pattern on the screen 3 meters ahead, and the actual position of the optical axis.

In addition, the measurement of the optical axis is conventionally carried out on a presumption that a light source of the headlight (i.e., a filament) is positioned in a predetermined position. However, there are cases where the actual position of the light source deviates from a set position due to an initial running-in period of suspension members, variations in the pneumatic pressures of tires, assembling inaccuracies of related parts, or the like. This deviation also gives rise to a difference between that position of the optical axis 10 meters ahead which is calculated on the basis of the position of the optical axis on the screen 3 meters ahead, and the actual position of the optical axis.

OBJECT AND SUMMARY OF THE INVENTION

In view of the above-described problems, this invention has an object of providing a method of measuring an optical axis of a headlight wherein light beams with directional vectors which have no relation with the long-distance illuminating pattern are decayed, and wherein the optical axis of the headlight can be accurately measured on the basis of the illuminating pattern at a short distance.

In order to attain the above-described object, this invention is a method of measuring an optical axis of a headlight comprising the steps of disposing a lattice member in front of the headlight, the lattice member having a plurality of longitudinally elongated lattice holes which are arranged in a form of a matrix, and measuring an illuminating area and an illuminance of light beams which are transmitted through each said lattice hole at each illuminating region which is divided into the form of the matrix by the lattice holes.

In one preferred mode, the lattice member may be made of a plurality of horizontal and vertical plates which are formed into a latticework. Or else, it may be an aggregation of a plurality of cylindrical members.

Since the lattice holes extend in the longitudinal direction, they do not allow the transmission of the light beams having directional vectors which are largely inclined towards the vertical and the horizontal directions and hence having no relation with the long-distance illuminating pattern. As a result, the illuminating pattern of the light beams which have been transmitted through the lattice member is similar to that of the long-distance illuminating pattern. It is therefore possible to accurately measure the optical axis of the headlight on the basis of the short-distance illuminating pattern of the light beams transmitted through the lattice member.

The illuminating pattern of the light beams to be transmitted through the lattice member is formed by illuminating each of illuminating regions divided into the form of a matrix by the lattice holes with the light beams passing therethrough. In an illuminating region which corresponds, among all lattice holes, to a particular lattice hole having an extended hole axis line which passes through the light source of the headlight, the light beams are illuminated over the entire surface of the illuminating region, resulting in a maximum illuminated area. On the other hand, in an illuminating region corresponding to a lattice hole which coincides with the optical axis of the headlight, the illuminance becomes maximum.

Therefore, even if the position of the light source is off the set position due to the initial running-in period of the suspension members, variations in the pneumatic pressures of tires, or the like, the position of the light source can be located or inferred from the illuminating region of maximum illuminated area. Out of this position of the light source and the position of the optical axis which is located from the illuminating region of maximum illuminance, the inclination angle of the optical axis is calculated. Thereafter, by adjusting the optical axis of the headlight depending on the deviation between this inclination angle and the set inclination angle of the optical axis, the long-distance displacement of the optical axis can be reduced to the best extent possible.

Further, even without the calculation of the inclination angle of the optical axis as described above, it is possible to match the inclination angle of the optical axis to the set inclination angle by adjusting the optical axis such that the illuminating region of maximum illuminance falls within a predetermined range, around the illuminating region of maximum illuminated area.

In this case, if each lattice hole is inclined so as to have the same inclination angle as that of the set inclination angle of the optical axis, the extension line of the hole axis of a particular lattice hole which coincides with the optical axis will pass through the light source when the inclination angle of the optical axis becomes the set inclination angle. Therefore, by making adjustments of the optical axis such that the illuminating region of maximum illuminated area comes into coincidence with the illuminating region of maximum illuminance, the inclination angle of the optical axis coincides with the set inclination angle.

In another aspect of this invention, a method of adjusting an optical axis of a headlight comprises the steps of disposing a lattice member in front of the headlight, the lattice member having a plurality of longitudinally elongated lattice holes which are arranged in a form of a matrix; measuring a size of illuminated area and an amount of illuminance of light beams to be transmitted through the lattice holes at each of the illuminating regions which are divided into a form of matrix by each of the lattice holes; finding out a position of a light source of the headlight based on the distribution of the illuminating regions having large sizes of illuminated area; and adjusting the optical axis based on a predetermined illuminating region which is located in a predetermined positional relationship with the position of the light source, such that illuminance distributions of horizontal illuminating regions and of vertical illuminating regions relative to the predetermined illuminating region, respectively, become predetermined illuminance distributions.

In still another aspect of this invention, a method of adjusting an optical axis of a headlight of asymmetrical luminous intensity distribution type comprises the steps of disposing a lattice member in front of the headlight, the lattice member having a plurality of longitudinally elongated lattice holes which are arranged in a form of a matrix; measuring a size of illuminated area and an amount of illuminance of light beams to be transmitted through the lattice holes at each of illuminating regions which are divided into a matrix by each of the lattice holes; finding out a position of a light source of the headlight based on the distribution of the illuminating regions having large sizes of illuminated area; and adjusting the optical axis such that an illuminance distribution pattern in an illuminating region which is in a predetermined positional relationship with the light source becomes a branched pattern in which the amount of illuminance on both sides of the branched pattern is intenser to substantially a same degree than on a central portion thereof.

In a further aspect of this invention, the method of adjusting an optical axis of a headlight comprises the steps of disposing a lattice member in front of the headlight, the lattice member having a plurality of longitudinally elongated lattice holes which are arranged in a form of a matrix; measuring a size of illuminated area and an amount of illuminance of light beams to be transmitted through the lattice holes at each of illuminating regions which are divided into a matrix by each of the lattice holes; and judging a type of headlight to see whether the headlight is of an asymmetrical luminous intensity distribution type or not. The step of judging comprises the steps of detecting an illuminance distribution pattern in each of the illuminating regions; and judging the headlight to be of the asymmetrical luminous intensity distribution type when the illuminance distribution pattern is a branched pattern in which the amount of illuminance on both sides of the branched pattern is intenser than on a central portion thereof.

BRIEF DESCRIPTION OF THE DRAWINGS

The above and other objects and the attendant advantages of this invention will become readily apparent by reference to the following detailed description when considered in conjunction with the accompanying drawings wherein:

FIG. 5, shown in detail in FIGS. 5(a) through 5(c), is a flow chart showing the procedure of adjusting the optical axis;

FIGS. 7 (a) and 7(b) are histograms showing the illuminating pattern of spot beam type of headlight;

FIGS. 8 (a) and 8(b) are histograms showing the illuminating pattern of flat beam type of headlight;

DETAILED DESCRIPTION OF THE INVENTION

Figure 1:
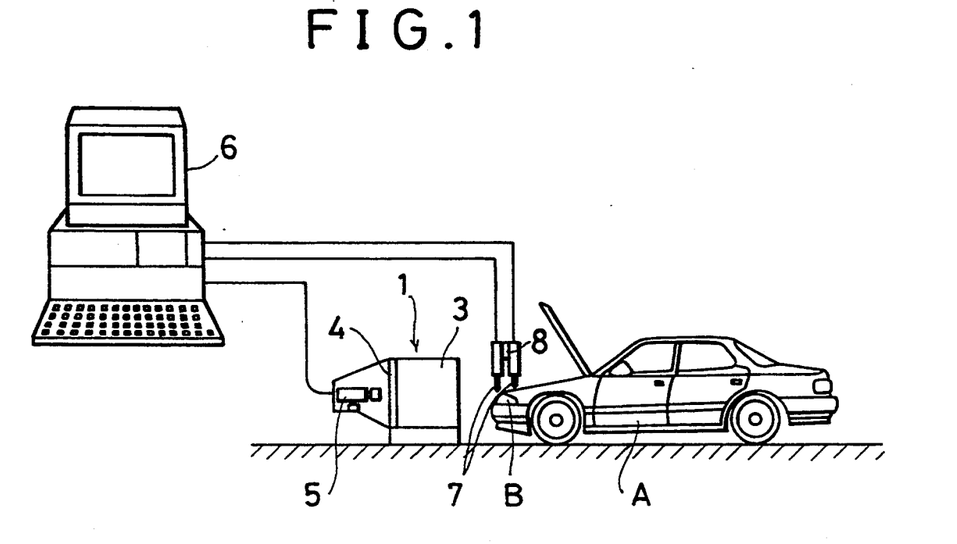
FIG. 1 is a diagram showing an embodiment of an apparatus to be used in this invention method.
Figure 2:
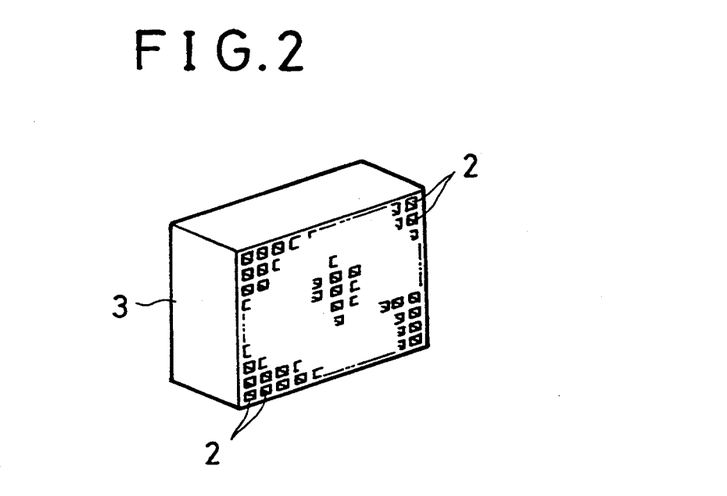
FIG. 2 is a perspective view of a lattice member.

With reference to FIG. 1, numeral 1 denotes an optical axis measuring apparatus which is positioned at a short distance of about 3 meters ahead of a headlight B of an automobile A which is stopped at a predetermined position. This apparatus comprises a lattice member 3 which is provided, as shown in FIG. 2, with a plurality of lattice holes 2 which extend in the longitudinal (i.e., forward and backward) direction, a screen 4 which is disposed in front (on an opposite side of the headlight) of the lattice member 3 and is made up of ground glass or the like, and a CCD camera 5 which is disposed in an opposing manner in front of the screen 4. A picture signal from the camera 5 is input into a computer 6 which contains therein a picture processing circuit. A servo driving unit 8 which has a pair of tools 7, 7 for adjusting the vertical and horizontal directions of the headlight B is controlled by the computer 6 to adjust the optical axis of the headlight B.

The axial length of the lattice holes 2 of the lattice member 3 is set to such a length of 30 cm–60 cm, for example, as will be sufficient to decay those light beams which have directional vectors largely inclined in the vertical and horizontal directions and hence have no relation with the long-distance illuminating pattern.

Figure 3:
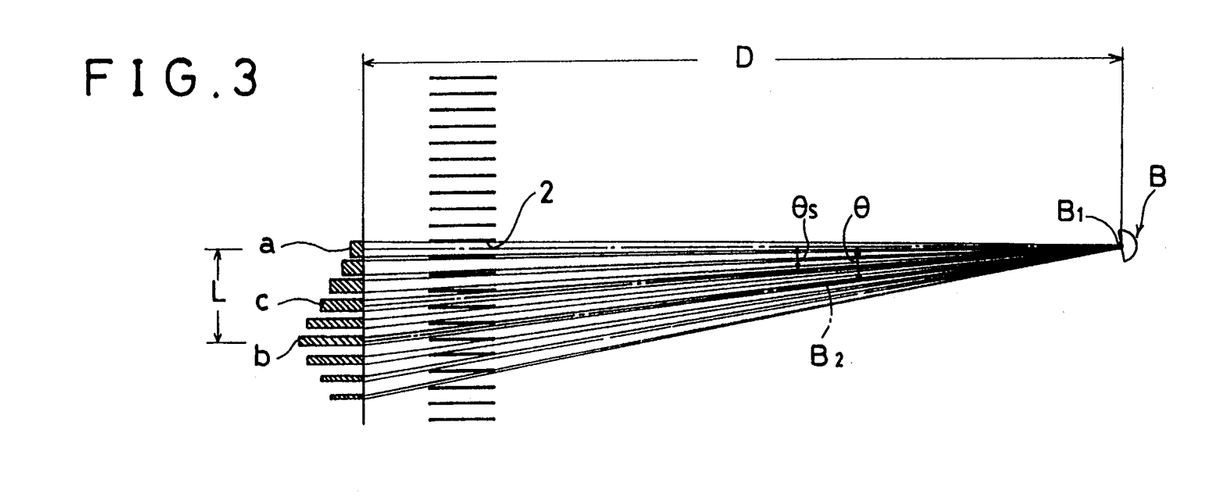
FIGS. 3 and 4 are diagrams explaining the operations, respectively.

The illuminating pattern, on the screen 4, of the light beams which have been transmitted through the lattice member 3 will be the one in which the light beams passing through each lattice hole 2 are illuminated on each of the illuminating regions as divided into the form of a matrix corresponding to the lattice holes 2. More detailed explanation is made taking, as an example, an illuminating pattern in the vertical section. In case the hole axis of each lattice hole 2 is horizontal, the transmitted light is illuminated on that entire surface of an illuminating region a which corresponds to a particular lattice hole 2 of the same level as the light source $B_1$ of the headlight B, as shown in FIG. 3. The illuminated area decreases as the region becomes away from the region a. The illuminance, on the contrary, becomes maximum at an illuminating region b corresponding to a lattice hole which coincides with the optical axis $B_2$ of the headlight B. The illuminance decreases as the region becomes away from the region b. The vertical widths of the hatched portions in FIG. 3 represent the illuminated area and the horizontal widths thereof represent illuminance.

The illuminating pattern on the screen 4 is pictured by the camera 5, and the pictured images are processed by the computer 6 to obtain a position of the illuminating region a in which the illuminated area becomes maximum and a position of the illuminating region b in which the illuminance becomes maximum. It is thus possible to locate or infer the position of the light source $B_1$ from the illuminated region a as well as the position of the optical axis $B_2$ from the illuminated area b. From thus located position of the light source $B_1$ and the position of the optical axis $B_2$, it is possible to calculate the inclination angle $\Theta$ of the optical axis $B_2$ through geometric calculations of $\tan \Theta = L/D$ where L is the distance on the screen between the illuminating region a in which the illuminated area is maximum and the illuminating region b in which the illuminance is maximum and where D is a predetermined distance between the headlight B and the screen 4. Thereafter, by obtaining a deviation of the inclination angle $\Theta$ from a set inclination angle $\Theta_s$ of the optical axis (i.e., position of optical axis specified by regulations), the driver unit 8 is driven, depending on the deviation, to adjust the optical axis $B_2$ of the headlight B until it coincides with $\Theta_s$.

When the inclination angle $\Theta$ of the optical axis $B_2$ coincides with $\Theta_s$, the illuminating region of maximum illuminance is transferred to a region as shown by c in FIG. 3. It means that the illuminating region of maximum illuminance is located within a predetermined range around the area a depending on $\Theta_s$. Therefore, it is possible to adjust the inclination angle of the optical axis of the headlight to coincide with $\Theta_s$ also by adjusting the optical axis through a feedback control such that the illuminating region of maximum illuminance is transferred within this predetermined range.

Figure 4:
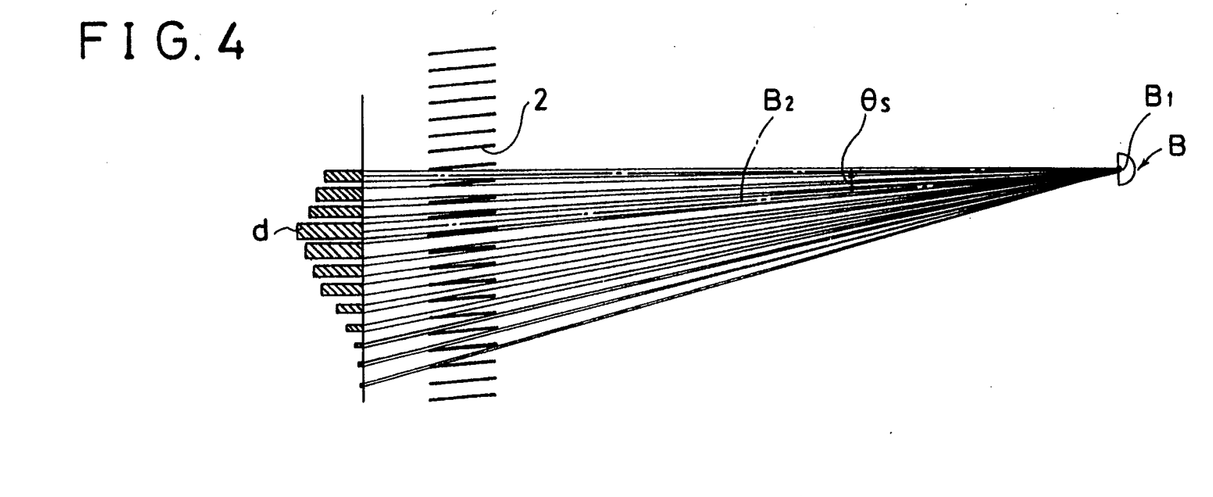

Now, another embodying example is explained in which each of the lattice hole 2 is inclined so that the hole axis has the same inclination angle as the set inclination angle $\Theta_s$. As shown in FIG. 4, when the inclination angle of the optical axis $B_2$ coincides with $\Theta_s$, the extension line of the hole axis of a lattice hole 2 through which the optical axis $B_2$ passes, passes through the light source $B_1$. As a result, both the illuminated area and the illuminance of the illuminating region d corresponding to that particular lattice hole 2 become maximum. Therefore, if the inclination angle of the optical axis is adjusted such that the illuminating region of maximum illuminance coincides with the illuminating region of maximum illuminated area, the inclination angle of the optical axis can be adjusted to the set inclination angle $\Theta_s$.

If the inclination angle of the optical axis is made to coincide with the set inclination angle as described above, the optical axis moves in parallel while keeping the set inclination angle even if the position of the light source $B_1$ deviates. Therefore, the deviation of the optical axis from its normal position can be kept within the deviation in the position of the light source $B_1$ irrespective of the distance from the headlight B.

A description has hereinabove been made about the adjustment of the optical axis of the headlight on condition that the light source of the headlight is a single point source. However, it will actually be more appropriate to think that the light beams are illuminated or irradiated from a plurality of imaginary light sources on a reflecting mirror instead of a single point source, when the light distribution pattern of the headlight, especially at the time of low beam, is handled. A detailed description about such an instance will now be made hereinbelow.

The headlight, if largely classified by the light distribution pattern at the time of low beam, can be grouped into an asymmetrical luminous intensity distribution type of light which is normally called the ECE system, a spot beam type of light and a flat beam type of light.

Figure 9A:
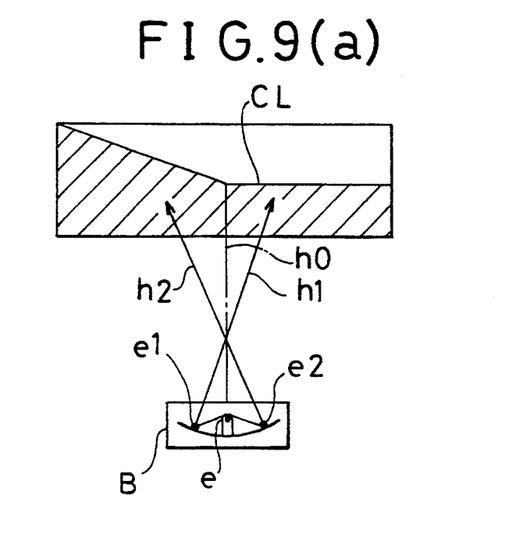
FIGS. 9(a) through 9(c) are diagrams showing the direction of light beam irradiation and light distribution pattern of asymmetrical luminous intensity distribution type of headlight, spot beam type of headlight and flat beam type of headlight, respectively.
Figure 10:
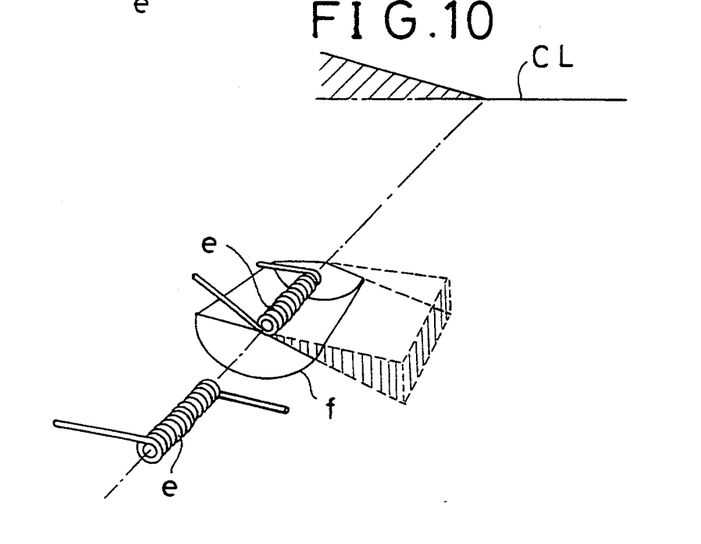
FIG. 10 is a perspective view showing the construction of asymmetrical luminous intensity distribution type of headlight.

The asymmetrical luminous intensity distribution type of light is provided, as shown in FIG. 10, with a light shielding plate f below a low-beam filament e which is provided in front of the focus of the reflecting mirror. In this arrangement, by cutting off that downward light from the filament e which is to be irradiated upwards by reflection upon the lower half of the reflecting mirror, it is so arranged that a clear line of demarcation between the bright portion and the dark portion, i.e., a cut-off line CL appears in the light distribution pattern. Further, the light shielding plate f is partly curtailed on one lateral side portion thereof. In this arrangement, the downward light as marked by vertical lines or shades in FIG. 10 is reflected by the reflecting mirror and is thus irradiated to the hatched portion on the laterally other side in this Figure so that the cut-off line CL rises obliquely upwards on the laterally other side. In this Figure, reference character e' denotes a high-beam filament which is positioned in the focus of the reflecting mirror. As shown in FIG. 9(a), when the low beam of asymmetrical luminous intensity distribution is irradiated, the light beams from an imaginary light source e1 on one side of the filament e as a true light source are irradiated towards an area below the horizontal portion of the cut-off line CL. The light beams from an imaginary light source e2 on the opposite side of the reflecting mirror are irradiated towards the portion below the rising part of the cut-off line CL. The optical axes h1, h2 of the light beams from both imaginary light sources e1, e2 cross each other at large angles. The example shown as illustrated is for the left-side traffic system and, therefore, the right-hand side of the shielding plate f is curtailed so that the cut-off line CL rises obliquely upwards on the left-hand side.

Figure 9B:
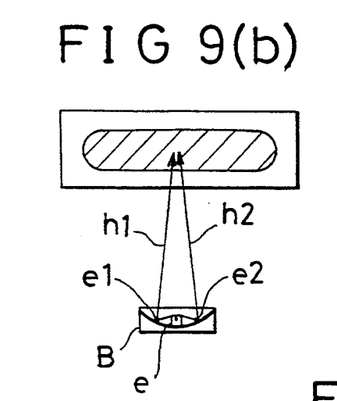

On the other hand, in the case of the spot beam type of light as shown in FIG. 9(b), the light beams from the imaginary light sources e1, e2 on the reflecting mirror on one side and the other side, respectively, of the filament e are irradiated in a concentrated manner to a limited or restricted illuminating region, and the optical axes h1, h2 of the light beams from the imaginary light sources e1, e2 are directed towards the central portion of the illuminating region.

Figure 9C:
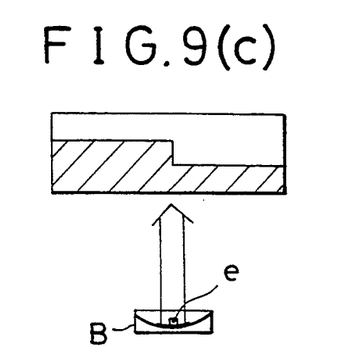

In the case of the flat beam type of light, as shown in FIG. 9(c), the imaginary light sources are not scattered but are present on a plane around the filament e. The light beams are illuminated substantially in parallel to each other towards a predetermined illuminating region, and the optical axes have some ranges to spread.

When the optical axes of the above-described headlights are adjusted on the basis of the illuminating pattern of light beams to pass through the lattice member 3, a single illuminating region of maximum illuminated area or of the maximum size of illuminated area can be identified provided the opening dimensions of each lattice hole 2 are arranged such that both imaginary light sources fall within the purview of any one of the lattice holes 2. However, if the opening dimensions of the lattice hole 2 are made small to minimize the adjustment tolerance of the optical axis, there will be generated a plurality of illuminating regions of maximum illuminated area with the result that the position of the light source cannot simply be located or identified. Further, the illuminating regions having a large illuminance or a large amount of illuminance will occur in a plurality of numbers with the result that the position of the optical axis cannot simply be identified. In the case of the asymmetrical luminous intensity distribution type of headlight, the optical axis is normally adjusted so that the cut-off line is located within a predetermined range or area. In case the optical axis is adjusted by using the lattice member 3, the light beams which are inclined beyond a certain degree or amount relative to the axial line of the lattice hole cannot pass through the lattice hole. It follows that the light beams will not be irradiated to those illuminating regions which are laterally or horizontally, or vertically apart from the lattice hole which is just opposite or in front of the light source. If the cut-off line falls within these illuminating regions, the position of the cut-off line will no longer be detected. Therefore, some kind of arrangement or contrivance is required in the adjustment of the optical axis of this kind of headlight.

Figure 6A:
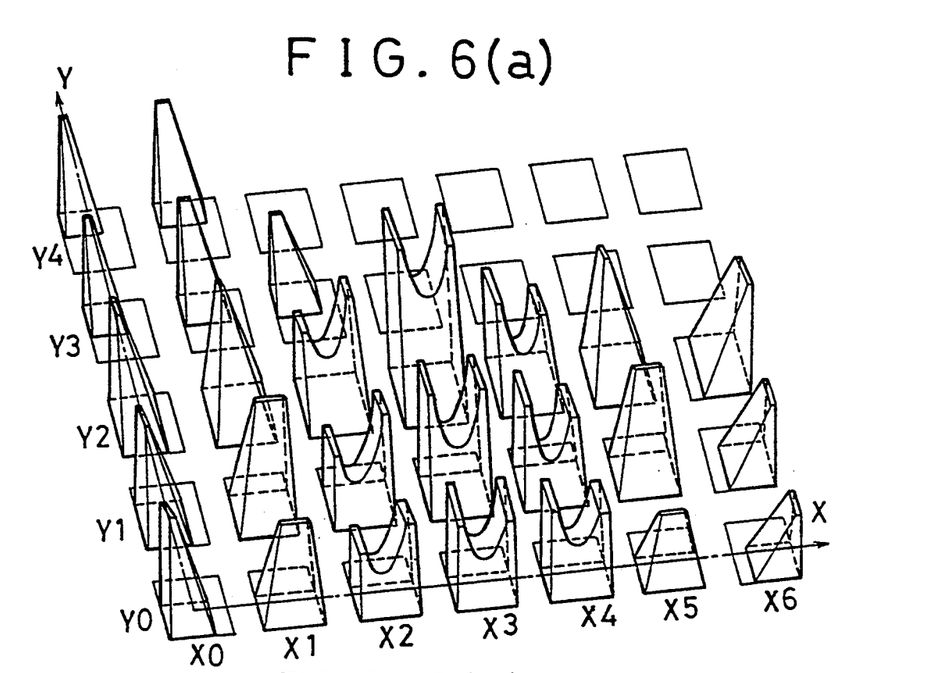
FIGS. 6(a) and 6(b) are histograms showing the illuminating pattern of asymmetrical luminous intensity distribution type of headlight.

In case the headlight B is of the asymmetrical luminous intensity distribution type having the cut-off line CL of upward inclination towards its left-hand side as shown in FIG. 9(a), the illuminating pattern on the screen 4 can be represented in three dimensions in the form of a histogram as shown in FIG. 6(a). In this Figure, the X-axis and the Y-axis respectively show the horizontal (i.e., lateral) and vertical coordinate axes. Suppose the coordinates of an illuminating region of the n-th horizontal coordinate value to the right an the m-th vertical coordinate value to the up from the left lower corner are represented to be (Xn, Ym). Then, the coordinates of the illuminating region which corresponds to the lattice hole 2 whose axial line passes through the left-hand side imaginary light source e1 of the headlight B, i.e., the lattice hole 2 which lies just in front of the imaginary light source e1, are (X1, Y2). The coordinates of the illuminating region which corresponds to the lattice hole 2 which lies just in front of the right-hand side imaginary light source e2 are (X5, Y2). In the five illuminating regions (X1, Y2), (X2, Y2), (X3, Y2), (X4, Y2) and (X5, Y2), the light beams are irradiated over their respective entire surfaces. The center of distribution (Xc, Yc) among these illuminating regions of large size of illuminated area, i.e., (X3, Y2) corresponds to the position, on the screen 4, of the filament e as the true light source.

To the lattice hole 2 which coincides with the equianglar divisional line h0 of the optical axis h1 of the light beams to be irradiated from the left-hand side imaginary light source e1 and the optical axis h2 of the light beams to be irradiated from the right-hand side imaginary light source e2, the light beams from the left-hand side imaginary light source e1 and the light beams from the right-hand side imaginary light source e2 will evenly be incident along the two diagonal lines in the longitudinal cross-sectional plane of this lattice hole. The illuminance distribution pattern in the illuminating region which corresponds to this lattice hole 2 will therefore be a branched pattern in which an amount of illuminance on both sides of the branched pattern is intenser to substantially the same degree than on the central portion, i.e., in which both sides of the histogram are higher to substantially the same height than in the central portion thereof. If the optical axis of the headlight B is in a correct direction or orientation, the illuminance or the amount of illuminance in the illuminating region which is in a predetermined positional relationship with the true light source (i.e., the illuminating region (X3, Y2) which coincides with the true light source in the headlight B used in this embodiment) will become high or intense, and its illuminance distribution pattern will become the above-described branched pattern.

Figure 6B:
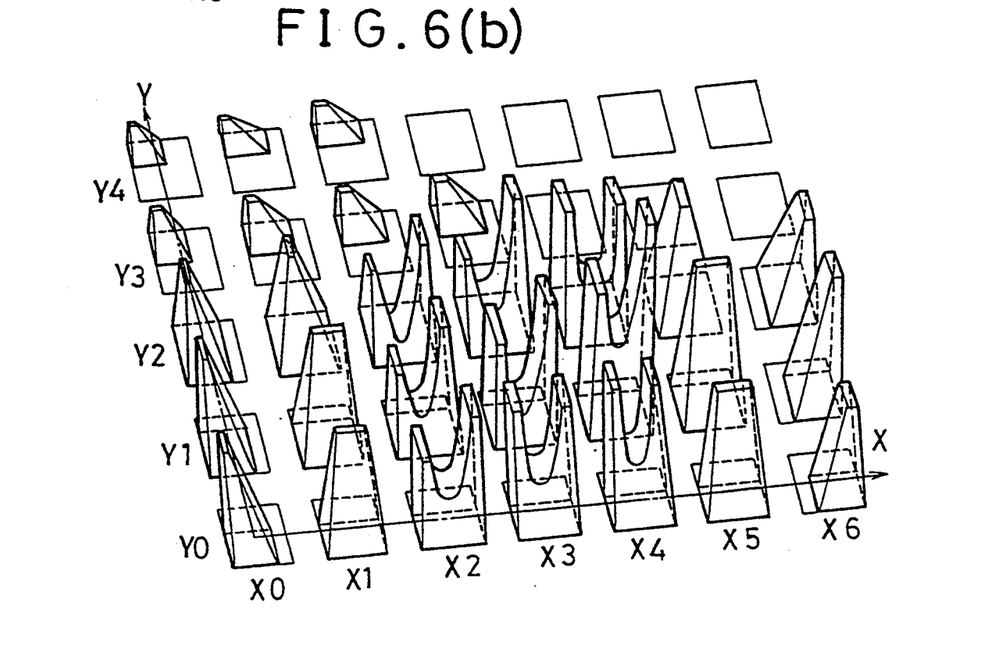

FIG. 6(b) is an illuminating pattern, on the screen 4, of the headlight B whose optical axis deviates downwards to the right. In this pattern, while the distribution of illuminating regions of large size of illuminated area does not change, the illuminance distribution pattern in the illuminating region (X3, Y2) which corresponds to the true light source will becomes a horizontally asymmetrical branched pattern because the amount of illuminance of the light beams from the right-hand side light source e2 to be irradiated towards the left-hand side portion of the illuminating region decreases due to the rightward deviation of the optical axis.

The light beams to be irradiated from the right-hand side imaginary light source e2 include the components which have the vectors of upward inclination towards the left (i.e., reflected light from the vertically shaded portion in FIG. 10). As a result, the light beams from the right-hand side imaginary light source e2 are irradiated to the left upper corner portion of a plurality of illuminating regions which are positioned on the left upper side of the illuminating region (X3, Y2) which corresponds to the true light source. If the optical axis deviates downwards, the amount of illuminance will decrease.

Figure 7A:
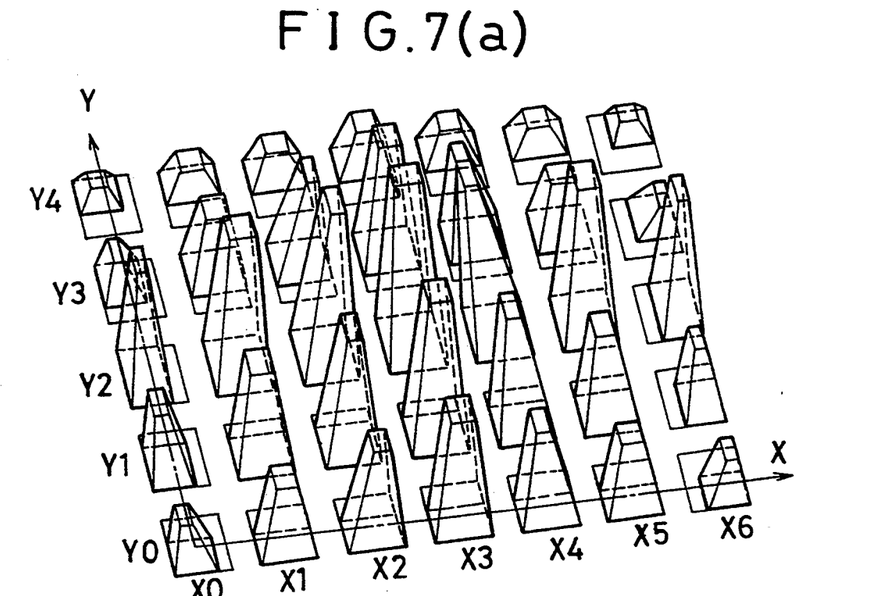
Figure 7B:
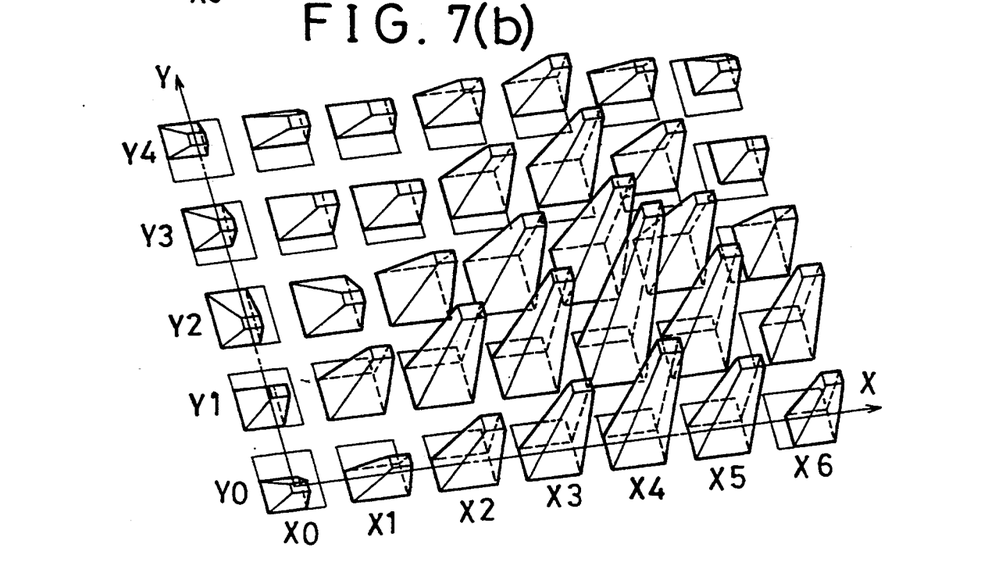

FIGS. 7(a) and 7(b) show an illuminating pattern, on the screen 4, of the spot beam type of headlight as shown in FIG. 9(b). The size of illuminated area becomes maximum in the illuminating region (X1, Y2) which corresponds to the lattice hole 2 just in front of the left-hand side imaginary light source e1, in the illuminating region (X5, Y2) which corresponds to the lattice hole 2 just in front of the right-hand side imaginary light source e2, and in the illuminating regions (X2, Y2), (X3, Y2) and (X4, Y2) between the above-described illuminating regions. The center (Xc, Yc) of distribution of the illuminating regions, i.e., (X3, Y2) will be the position, on the screen 4, of the filament e as the true light source. If the direction or orientation of the headlight B is correct or normal, the amount of illuminance will be maximum in the illuminating region (X3, Y2) as shown in FIG. 7(a) and then gradually decreases towards the right and left as well as upper and lower sides thereof. In case the optical axis of the headlight deviates, the symmetry of the illuminance distribution around the position of the light source as its center can no longer be maintained. When the optical axis deviates, for example, downwards to the right, the illuminating pattern will be as shown in FIG. 7(b).

Figure 8A:
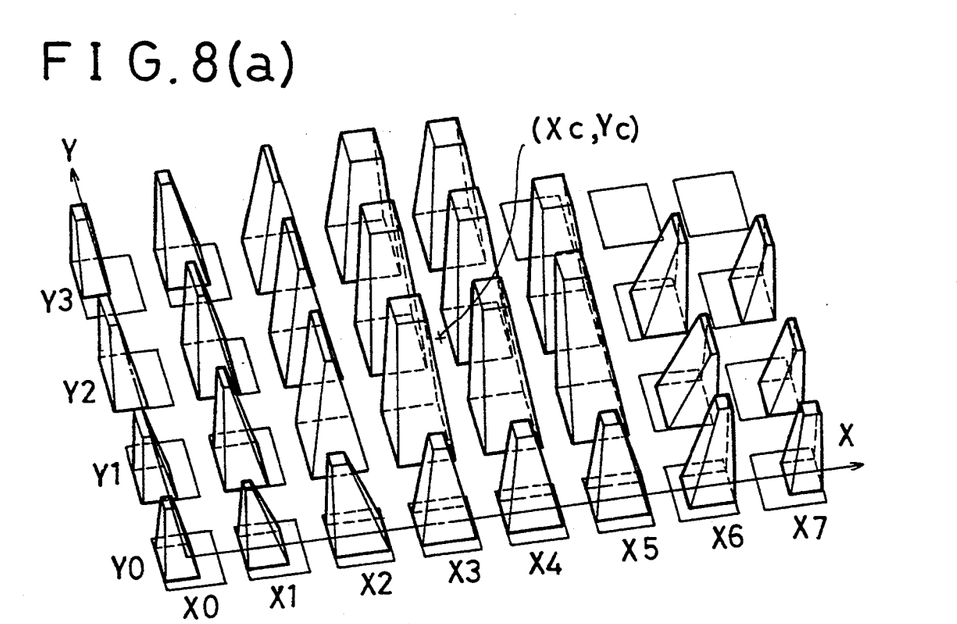
Figure 8B:
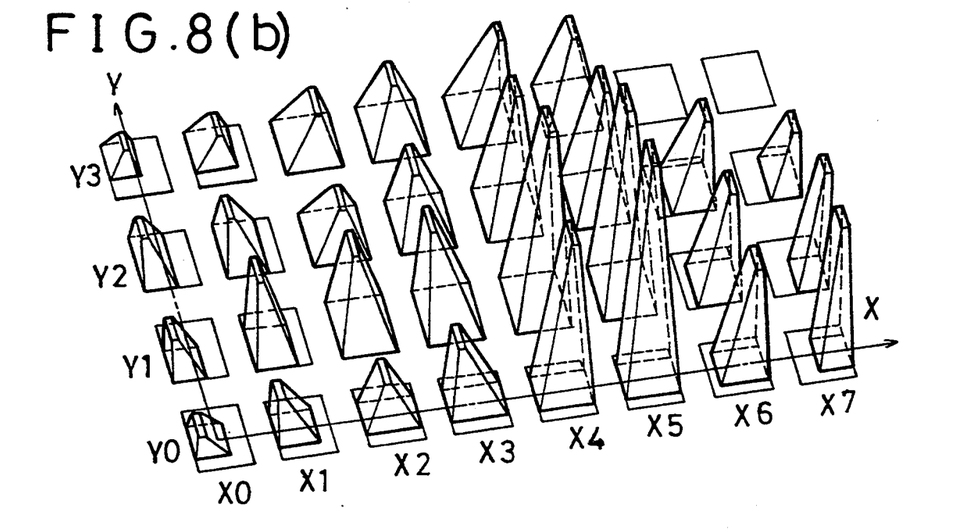

FIGS. 8(a) and 8(b) show an illuminating pattern, on the screen 4, of the flat beam type of headlight as shown in FIG. 9(c). The size of illuminated area becomes maximum in those illuminating regions within the X-coordinates of X2 through X5 and the Y-coordinates of Y1 through Y3 which face the planar imaginary light source. If the direction or orientation of the headlight is correct or normal, the amount of illuminance will also become large in those plurality of illuminating regions which have large sizes of illuminated area. However, if the optical axis deviates, even distribution of the amount of illuminance within those plurality of illuminating regions which have large sizes of illuminated area will no longer be maintained. If the optical axis deviates downwards to the right, the illuminating pattern will be as shown in FIG. 8(b). The position, on the screen 4, of the true light source falls on the center (Xc, Yc) of distribution of the illuminating regions which have large sizes of illuminated area. Should, however, the coordinates (Xc, Yc) fall between two illuminating regions as shown in FIG. 8(a), the measuring steps, which will hereinafter be described, are carried out on condition that one of the right and left sides thereof, e.g., the left side ((X3, Y2) in FIG. 8(a)), is supposed to be (Xc, Yc).

Figures 5, 5A, 5B, 5C:
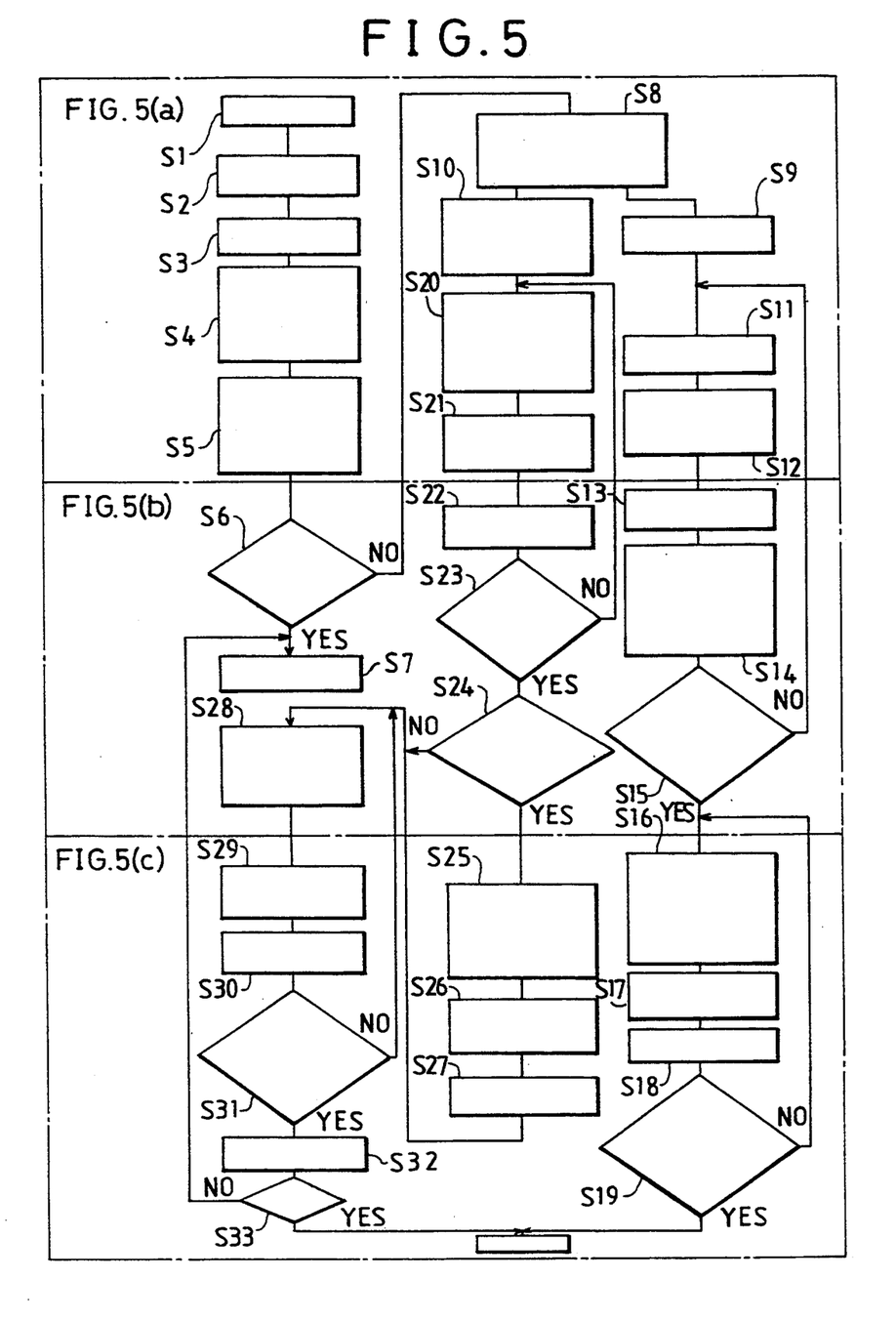
Figure 5A:
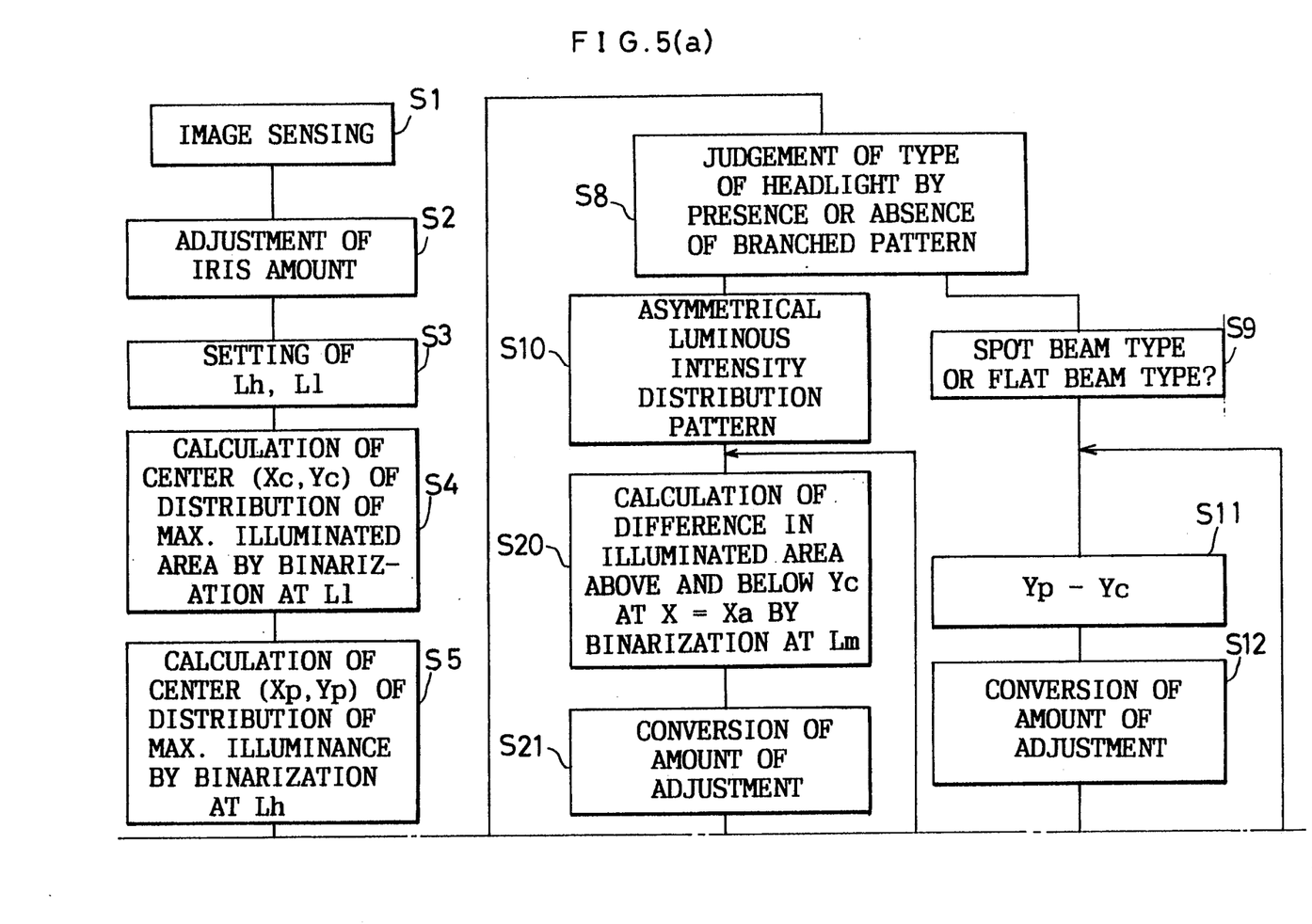
Figure 5B:
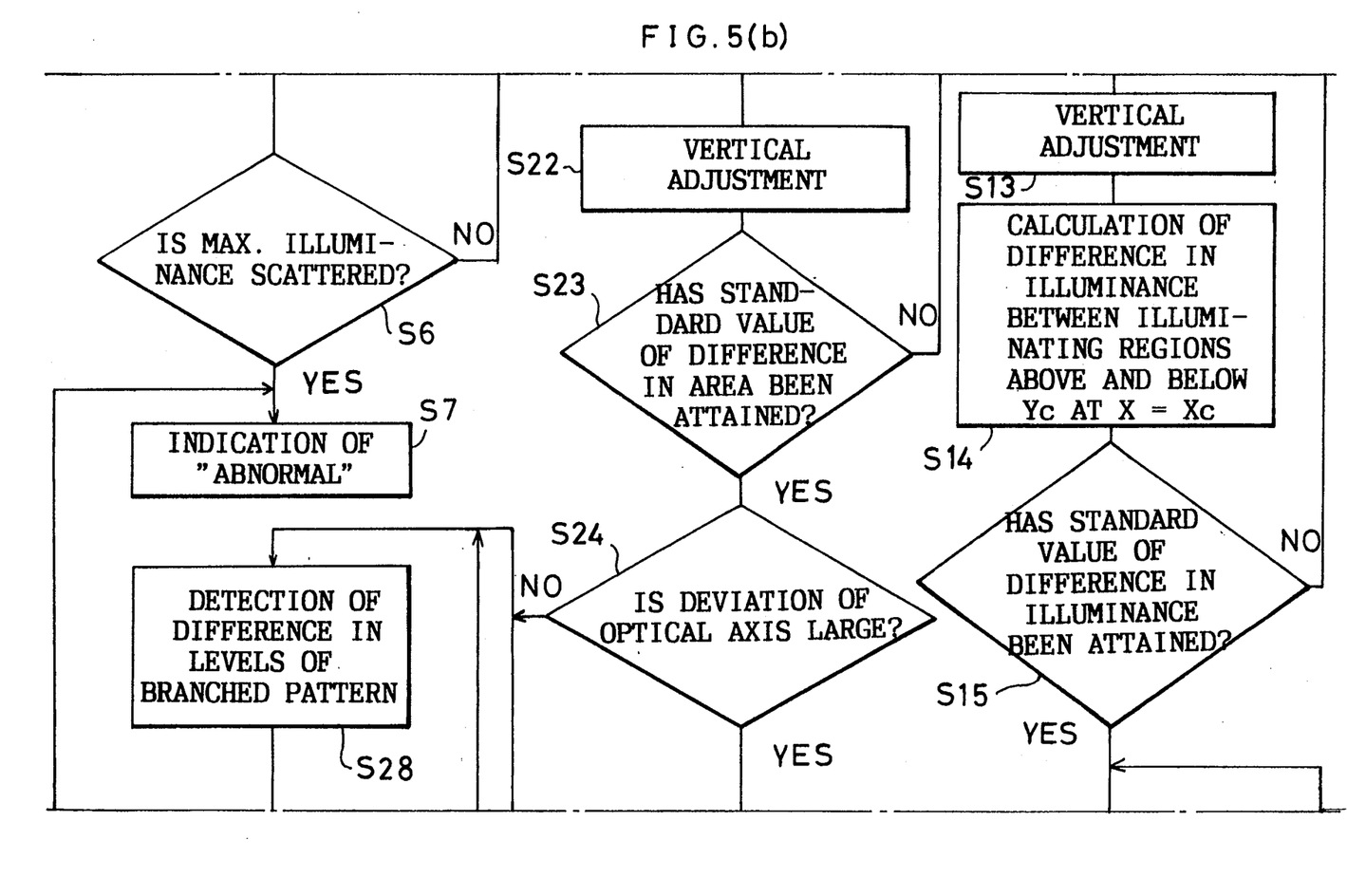
Figure 5C:
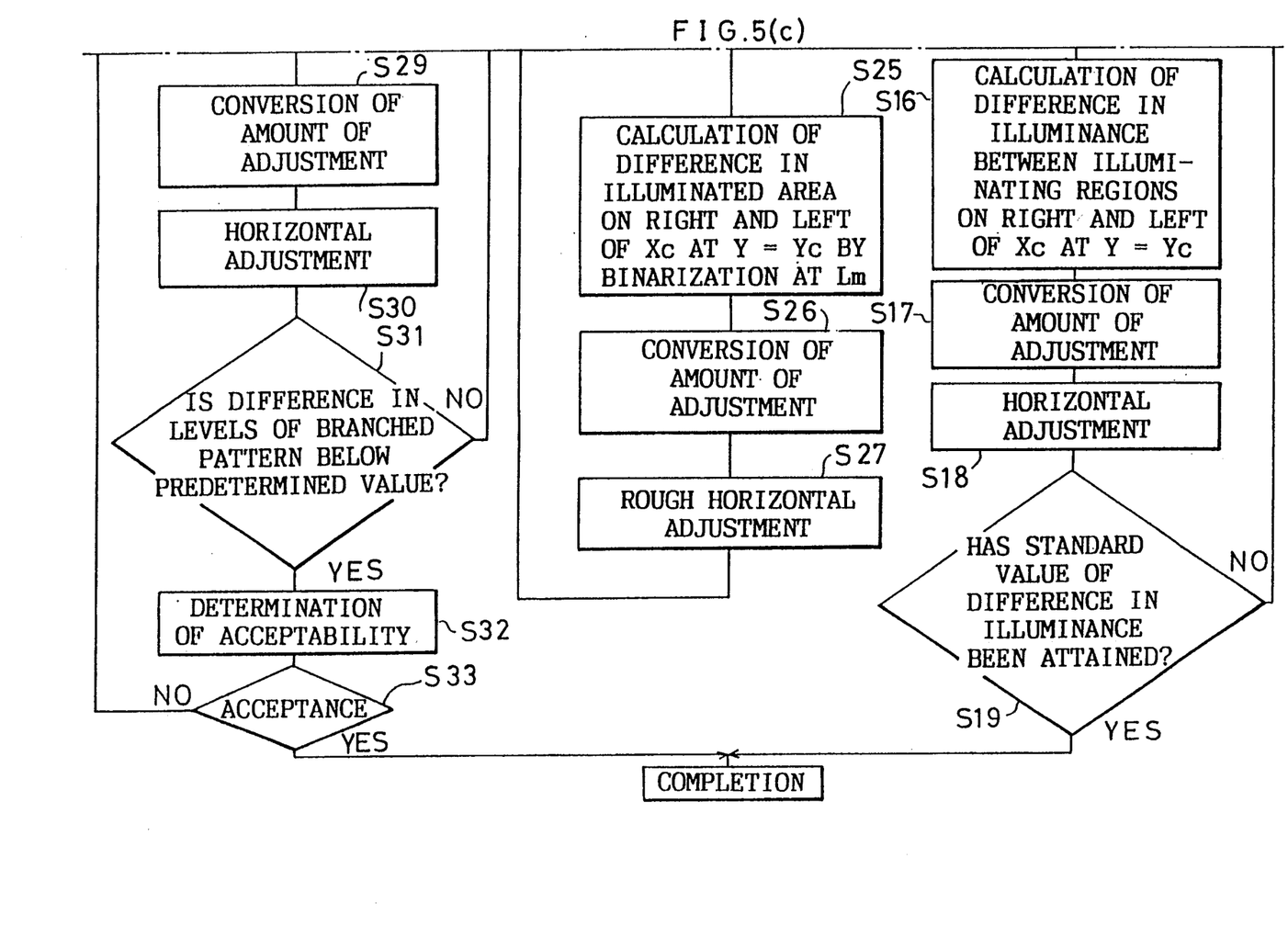

Based on the above-described findings, the optical axis of the headlight B is adjusted in this embodiment in the procedures shown in FIG. 5 which is divided into details in FIGS. 5(a) through 5(c). Namely, the illuminating pattern on the screen 4 is first pictured or image-sensed by the CCD camera (step S1). The iris amount of the camera 5 is adjusted (S2), and upper and lower threshold values Lh, Ll of the amount of illuminance are set (S3). The size of illuminated area above Ll in each of the illuminating regions is obtained by binarization at Ll, and the coordinates (Xc, Yc) of that center of distribution of the illuminating regions in which the size of the illuminated area becomes maximum are calculated (S4). Also, by binarization at Lh, the coordinates (Xp, Yp) of the center of distribution of the illuminating regions which have the amount of illuminance above Lh are calculated.

Here, as long as the reflecting mirror and the lens of the headlight B have no distortions or the like, the illuminating regions which have the amount of illuminance above Lh should be concentrated on a particular region. Therefore, if the illuminating regions which have a large amount of illuminance are scattered from each other, an indication of "abnormal" is made and the processing is stopped (S6, S7). Otherwise, the type of headlight is judged (S8).

This judgement of the type of headlight is made by checking whether there exists or not an illuminating region having a branched pattern of illuminance in which the amount of illuminance on both sides thereof is intenser than on the center thereof. It is only the asymmetrical luminous intensity distribution type of headlight that has the illuminating regions with branched illuminating distribution pattern. If there does not exist such an illuminating region, the headlight is judged to be either of the spot beam type or the flat beam type (S9) and, if there exists, the headlight is judged to be of the asymmetrical luminous intensity distribution type (S10). Thereafter, the adjustments of the optical axis are made in the following procedure.

In case the headlight is either of the spot beam type or the flat beam type, the amount of deviation of the Yp and Yc is calculated in order to first carry out the vertical adjustments to vertically align the direction or orientation of the headlight (S11). This amount of deviation is converted to an amount of adjustment in the vertical direction and the vertical adjustment is made (S12, S13). Then, a vertical scanning is carried out at X=Xc to calculate the difference in the amount of illuminance between the total amount of illuminance in the illuminating regions above Yc and the total amount of illuminance in the illuminating regions below Yc (S14). A judgement is then made to see whether the difference in the amount of illuminance has become a standard or reference value (S15). The vertical adjustment is repeated until the difference in the amount of illuminance decreases to the standard value. Once the difference in the amount of illuminance has decreased to the standard value, the horizontal adjustment to the right and left is then made to align the horizontal direction or orientation of the headlight.

In carrying out the horizontal adjustment, a horizontal scanning is carried out at Y=Yc to calculate the difference in the amount of illuminance between the total of the amount of illuminance in the illuminating regions on the left of Xc and the total of the amount of illuminance in the illuminating regions on the right of Xc (S16). This difference in the amount of illuminance is converted to an amount of adjustment in the horizontal direction and the horizontal adjustment is made (S17, S18). A judgement is then made to see whether the difference in the amount of illuminance has reached a standard or reference value (S19). The horizontal adjustment is repeated until the difference in the amount of illuminance decreases to the standard value. Once the difference in the amount of illuminance has decreased to this standard value, the adjustments of the optical axis are finished.

A conversion coefficient for conversion of the amounts of adjustments in the steps S12 and S17 and the standard values in the steps S15 and S19 must be set to different values between the spot beam type and the flat beam type of headlights. Here, the number of illuminating regions in which the size of the illuminated area becomes maximum is larger in the flat beam type of headlight than in the spot beam type of headlight. Therefore, a judgement is made based on this number to see whether the headlight in question is of the spot beam type or the flat beam type, and then the above-described conversion coefficients and the standard values are set.

In case of the asymmetrical luminous intensity distribution type of headlight, vertical scanning is first made at X=Xa, where Xa (X1 in FIG. 6) is the X-axis coordinate of that illuminating region, among the illuminating regions of maximum illuminated area, which is most deviated towards the side where the cut-off line CL obliquely rises. Binarization is then made at an amount of illuminance Lm which is a predetermined ratio, e.g., 70%, of Lh. The difference in size of area between the total size of the illuminated area above Lm in the illuminating regions below Yc and the total size of the illuminated area above Lm in the illuminating regions above Yc is calculated (S20). This difference in size of area is converted to the vertical amount of adjustment and a vertical adjustment is carried out (S21, S22). Then, a judgement is made whether the difference in size of area has reached a standard or reference value (S23) and the adjustment is repeated until the difference in size of area reaches the standard value. Once the difference in size of area has reached the standard value, the horizontal adjustment to the right and left is carried out.

In carrying out the horizontal adjustment, a judgment is first made whether the deviation of the optical axis is large or not based on the amounts of deviation between (Xc, Yc) and (Xp, Yp) (S24). When the deviation is large, a horizontal scanning is made at Y=Yc. By binarization at Lm, the difference in area between the total of illuminated area above Lm in the illuminating regions on the left side of Xc and the total of illuminated area above Lm in the illuminating regions on the right side of Xc (S25) is calculated. This difference in illuminated area is converted to the amount of horizontal adjustment and an approximate or rough adjustment is carried out (S26, S27). Then, the difference in the levels of the branched distribution pattern of the amount of illuminance in the illuminating region of (Xc, Yc) is detected (S28). When the deviation of the optical axis is small, the step may be proceeded from S24 directly to S28. Then, the difference in the levels of the branched illuminance distribution pattern is converted to the horizontal amount of adjustment and the horizontal adjustment is carried out (S29, S30). A judgement is made to see whether the difference in the levels of the branched illuminance distribution pattern has become below a predetermined value or not (S31) and the steps S28 through S30 are repeated until a value below the predetermined one is attained.

When the difference in the level of the branched illuminance distribution pattern has become below the predetermined value, the difference in the amount of illuminance between the two illuminating regions (e.g., (X3, Y3), (X3, Y4) in FIGS. 6(a) and 6(b)) which are to be determined by (Xc, Yc) and which should be located above and below the rising portion of the cut-off line CL, is detected and an inspection is made to judge whether the result is acceptable or not (S32). If the headlight B is normal, this difference in the amount of illuminance will be above a predetermined value. If the rising inclination at the rising portion of the cut-off line CL is off the normal angle due to assembling errors or the like of the filament e and the light shielding plate f, the rising portion will not pass through the above-described two illuminating regions and, as a result, the difference in the amount of illuminance becomes below the predetermined value. If the difference in the amount of illuminance is above the predetermined value, the headlight in question is judged to be acceptable and the adjustment is finished (S33). If the difference in the amount of illuminance falls short of the predetermined value, it is judged to be unacceptable and an indication of "abnormal" is made.

The reason why the vertical and horizontal adjustments are made, in the case of the headlight of asymmetrical luminous intensity distribution type, based on the difference in size of illuminated area above Lm in the horizontal and vertical directions is that the illuminance distribution pattern in a plurality of illuminating regions becomes a branched one and, consequently, the overall illuminance distribution pattern on the screen 4 cannot be detected by the amount of illuminance alone. This kind of vertical and horizontal adjustments can also be made with the spot beam type and the flat beam type of headlights, based on the difference in illuminated area above Lm in the horizontal and vertical directions in the illuminating regions. It is also possible to make the horizontal and vertical adjustments based on the difference in volume in the vertical and horizontal directions of the histogram shown in FIGS. 6(a), 6(b) through FIGS. 8(a), 8(b).

It is readily apparent that the above-described method of measuring an optical axis and a method of adjusting an optical axis meet all of the above-described and other objects and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of measuring an optical axis of a headlight comprising the steps of:
    disposing a lattice member in front of the headlight, said lattice member having a plurality of longitudinally elongated lattice holes which are arranged in a form of a matrix; and
    measuring an illuminated area and an illuminance of light beams which are transmitted through each said lattice hole at each illuminating region which is divided into the form of the matrix by said lattice holes.

2. A method of measuring an optical axis of a headlight according to claim 1, wherein a position of a light source of the headlight is located by an illuminating region of maximum illuminated area and a position of an optical axis of the headlight is located by an illuminating region of maximum illuminance.

3. A method of adjusting an optical axis of a headlight comprising the steps of:
    disposing a lattice member in front of the headlight, said lattice member having a plurality of longitudinally elongated lattice holes which are arranged in a form of a matrix;
    measuring a size of an illuminated area and an amount of illuminance of light beams to be transmitted through said lattice holes at each of illuminating regions which are divided into a matrix by each of said lattice holes;
    locating a position of a light source from an illuminating region of maximum illuminated area and a position of an optical axis of the headlight from an illuminating region of maximum illuminance;
    calculating an inclination angle of said optical axis from the located position of said light source and the position of said optical axis; and
    adjusting said optical axis depending on a deviation between the calculated inclination angle and a set inclination angle.

4. A method of adjusting an optical axis of a headlight comprising the steps of:
    disposing a lattice member in front of the headlight, said lattice member having a plurality of longitudinally elongated lattice holes which are arranged in a form of a matrix;
    measuring a size of an illuminated area and an amount of illuminance of light beams to be transmitted through said lattice holes at each of illuminating regions which are divided into a matrix by each of said lattice holes; and
    adjusting said optical axis of the headlight such that an illuminating region of maximum illuminance falls within a predetermined range around an illuminating region of maximum illuminated area.

5. A method of adjusting an optical axis of a headlight according to claim 4, wherein each of said lattice holes is inclined so that said lattice holes have an inclination angle equal to a set inclination angle of said optical axis and wherein said optical axis of the headlight is adjusted so that said illuminating region of maximum illuminance comes into coincidence with said illuminating region of maximum illuminated area.

6. A method of adjusting an optical axis of a headlight comprising the steps of:
 disposing a lattice member in front of the headlight, said lattice member having a plurality of longitudinally elongated lattice holes which are arranged in a form of a matrix;
 measuring a size of illuminated area and an amount of illuminance of light beams to be transmitted through said lattice holes at each of illuminated regions which are divided into a matrix by each of said lattice holes;
 finding out a position of a light source of the headlight based on the distribution of said illuminating regions having large sizes of illuminated area; and
 adjusting said optical axis based on a predetermined illuminating region which is located in a predetermined positional relationship with said position of said light source, such that illuminance distributions of horizontal illuminating regions and of vertical illuminating regions relative to said predetermined illuminating region, respectively, become predetermined illuminance distributions.

7. A method of adjusting an optical axis of a headlight of asymmetrical luminous intensity distribution pattern comprising the steps of:
 disposing a lattice member in front of the headlight, said lattice member having a plurality of longitudinally elongated lattice holes which are arranged in a form of a matrix;
 measuring a size of illuminated area and an amount of illuminance of light beams to be transmitted through said lattice holes at each of illuminating regions which are divided into a matrix by each of said lattice holes;
 finding out a position of a light source of the headlight based on the distribution of said illuminating regions having large sizes of illuminated area; and
 adjusting said optical axis such that an illuminance distribution pattern in an illuminating region which is in a predetermined positional relationship with said light source becomes a branched pattern in which said amount of illuminance on both sides of said branched pattern is intenser to substantially a same degree than on a central portion thereof.

8. A method of adjusting an optical axis of a headlight comprising the steps of:
 disposing a lattice member in front of the headlight, said lattice member having a plurality of longitudinally elongated lattice holes which are arranged in a form of a matrix;
 measuring a size of illuminated area and an amount of illuminance of light beams to be transmitted through said lattice holes at each of illuminating regions which are divided into a matrix by each of said lattice holes; and
 judging a type of headlight to see whether the headlight is of an asymmetrical luminous intensity distribution type or not;
 said step of judging comprising the steps of:
 detecting an illuminance distribution pattern in each of said illuminating regions; and
 judging the headlight to be of the asymmetrical luminous intensity distribution type when said illuminance distribution pattern is a branched pattern in which the amount of illuminance on both sides of said branched pattern is intenser than on a central portion thereof.

* * * * *